No. 641,774. Patented Jan. 23, 1900.
F. C. HOLDER.
HOG SCALDING DEVICE.
(Application filed Feb. 2, 1898.)

(No Model.) 3 Sheets—Sheet 1.

Witnesses

Inventor
Fred C. Holder
by
Coburn, Hibben & McElroy
Attys

No. 641,774. Patented Jan. 23, 1900.
F. C. HOLDER.
HOG SCALDING DEVICE.
(Application filed Feb. 2, 1898.)

(No Model.) 3 Sheets—Sheet 2.

Witnesses
Inventor
Fred C. Holder
by Coburn, Hibben & McElroy
Attys

No. 641,774. Patented Jan. 23, 1900.
F. C. HOLDER.
HOG SCALDING DEVICE.
(Application filed Feb. 2, 1898.)
(No Model.) 3 Sheets—Sheet 3.
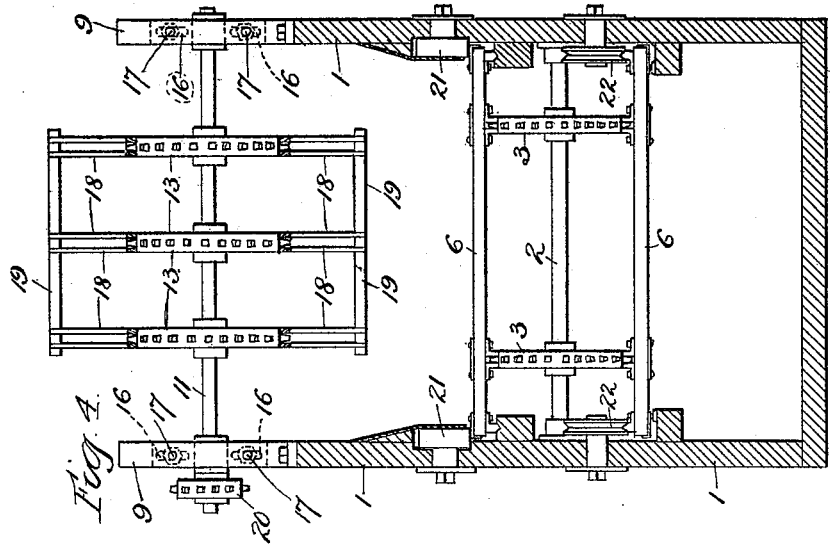
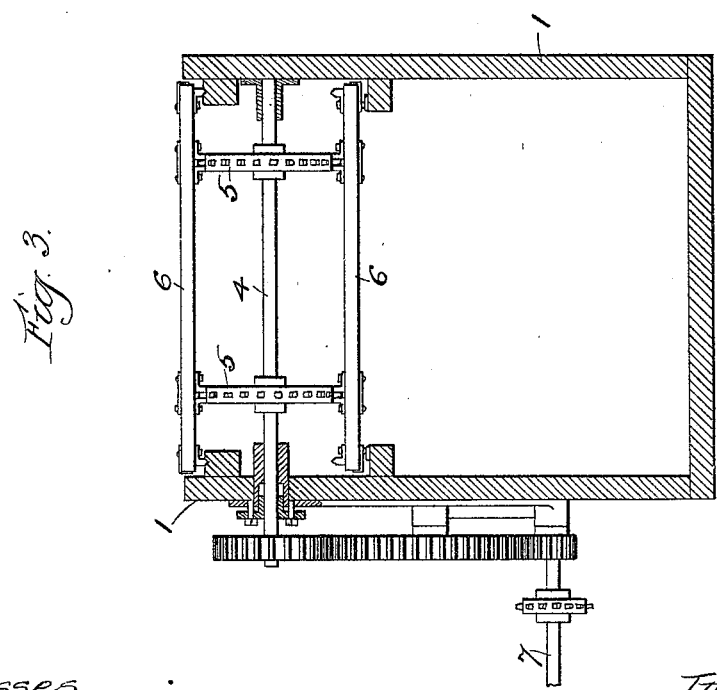

UNITED STATES PATENT OFFICE.

FRED C. HOLDER, OF CHICAGO, ILLINOIS, ASSIGNOR TO THE SWIFT & COMPANY, OF SAME PLACE.

HOG-SCALDING DEVICE.

SPECIFICATION forming part of Letters Patent No. 641,774, dated January 23, 1900.

Application filed February 2, 1898. Serial No. 668,807. (No model.)

*To all whom it may concern:*

Be it known that I, FRED C. HOLDER, residing at Chicago, in the county of Cook and State of Illinois, have invented certain new and useful Improvements in Hog-Scalding Devices, of which the following is a specification.

My invention relates to hog-scalding devices as usually employed in packing-houses and the like; and its object is to provide mechanism for automatically passing the hogs through the scalding-tub and delivering them therefrom, a portion of such mechanism being preferably adapted to serve as a bristle-picking bench.

My invention embodies advantageous features of construction and operation, which will be apparent from the description hereinafter given.

Figure 1:
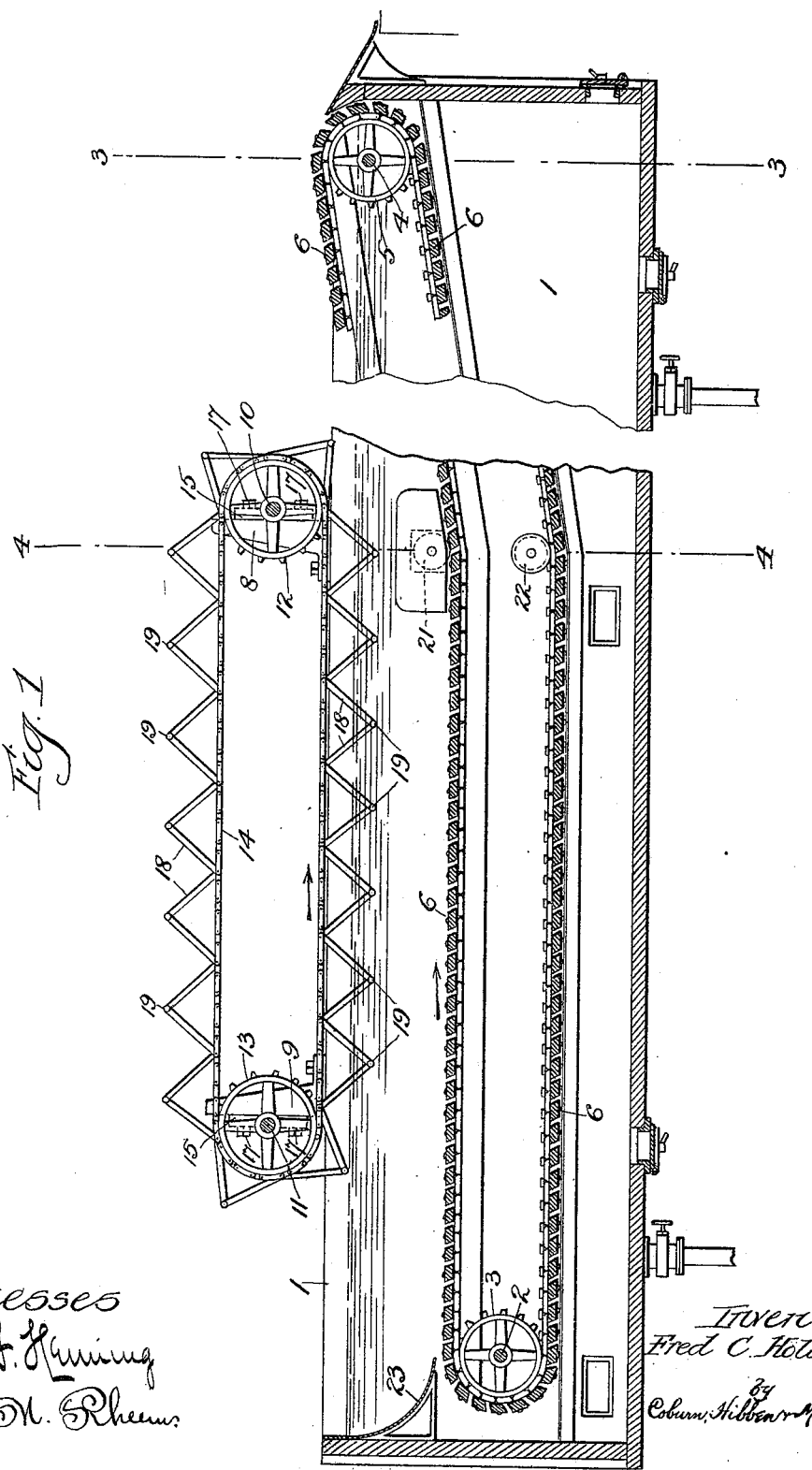
Figure 2:
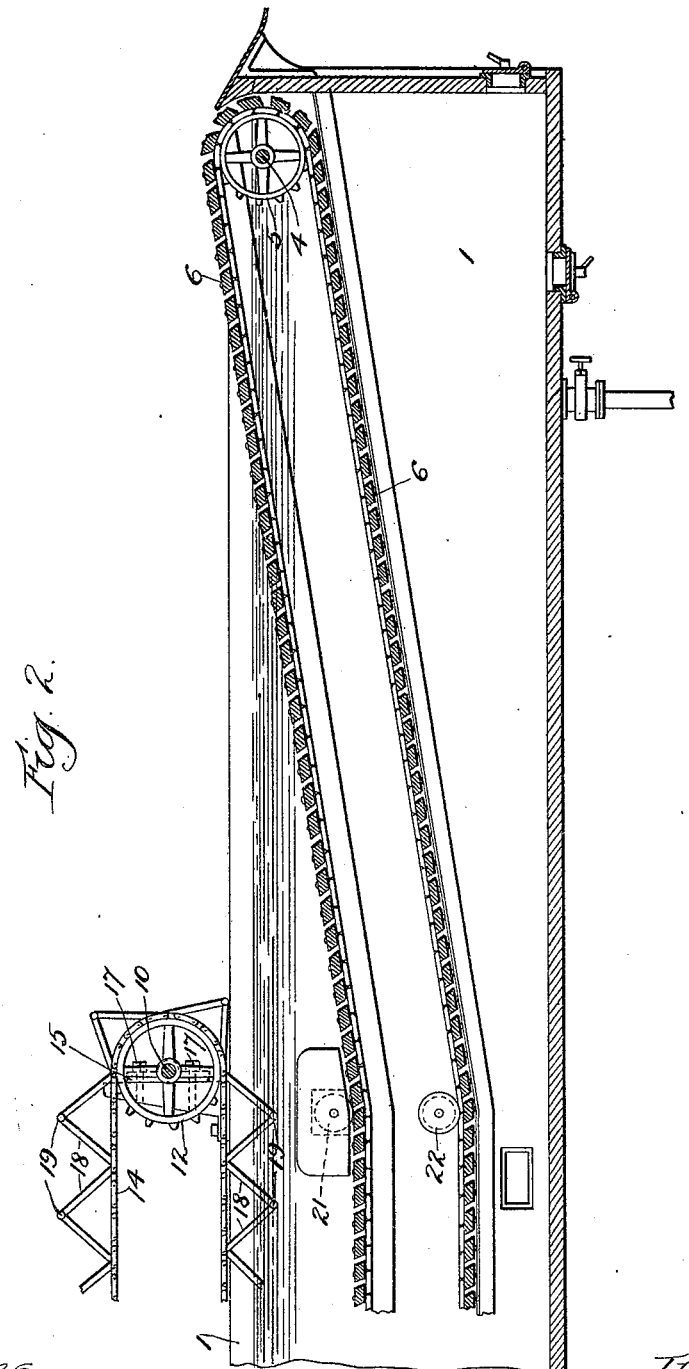

In the drawings, Figure 1 represents a sectional elevation taken longitudinally through the scalding-tub, but broken away through the inclined portion of the endless platform; Fig. 2, a similar view showing this inclined portion continuous; Fig. 3, a sectional elevation taken on the line 3 of Fig. 1, and Fig. 4 a sectional elevation taken on the line 4 of Fig. 1.

The usual scalding-tub 1 is made of the proper proportions to accommodate my device, as hereinafter described. Within the tub, near its bottom and substantially at one end thereof, is journaled a carrier-shaft 2, having suitable sprocket-wheels 3, and at the opposite end of the tub, substantially at the top thereof, is journaled a similar shaft 4, having suitable sprocket-wheels 5. An endless traveling platform 6, formed of suitable cross-bars secured to endless belts, extends around these carrier-shafts and is driven, preferably, through the shaft 4, which may be driven, through suitable gearing, from a power-shaft 7, as shown more particularly in Fig. 3. Upon opposite sides of the tub are secured two pairs of standards or supports 8 and 9, respectively, which provide bearings for two carrier-shafts 10 and 11, each having any suitable number of sprocket-wheels 12 and 13, around which run endless sprocket or belt chains 14. The entire device may be adjusted vertically by any suitable adjusting mechanism, such as that shown in Figs. 1 and 4, in which the bearings 15, having the slots 16, may be moved to the desired position and retained by bolts 17. It will be understood, however, that any other suitable adjusting mechanism may be adopted so long as the desired purpose is subserved.

Secured to the endless belt or chain are a series of links 18, whose arrangement and relation are illustrated in Figs. 1 and 2. The outer ends of these links are secured to suitable cross-bars 19, so that there is thus formed an endless chain which extends somewhat below the water-line, the degree thereof being regulated by the adjusting mechanism. This endless chain receives its motion through either one of the carrier-shafts; but, as shown in the drawings, the shaft 10 is the driving-shaft, which is driven by means of the sprocket-wheel 20.

Part way of the length of the endless apron or platform, and preferably below the forward end of the endless belt or chain thereabove, is arranged a pair of idler wheels or pulleys 21, journaled in opposite sides of the tub. These pulleys bear upon the top of the platform, so as to keep such platform level from the rear end of the tub up to this point before forming an incline by ascending to the carrier-shaft 4. A similar pair of idlers 22 are located below the other pair and serve to preserve the distance between the upper and lower portions or planes of the platform. At the rear end of the tub a curved piece or surface 23 is provided, so as to avoid any possibility of a hog being caught behind the end of the platform after being dropped from the sticking-bar.

The idler-wheels 21 bear only upon the extreme sides of the traveling platform and act as projections in order to keep the same in proper position without in any way interfering with or obstructing the carrying-surface of such platform. The other idlers 22 are simply to keep the lower portion of the platform from bearing against the upper portion at the turn or deflection made by the idlers 21. Consequently, as is obvious, such idlers 22 need not necessarily be of the construction shown, because the question of obstruction does not here arise, and any other obvious means for the purpose may be employed.

My device operates as follows: It being understood that the tub is filled with hot water to the desired level and the endless platform and chain, above described, actuated in the direction indicated by the arrows, the hogs are dropped from the sticking-bar into the tub. They fall upon the endless platform and are carried thereby toward the forward end of the tub and are kept submerged by the endless chain thereabove and prevented from floating. This submerging device has an additional function in that it assists in passing the hogs through the tub, particularly those hogs which tend to rise to the surface of the water and are known as "floaters." As shown in Fig. 4, what I will term the "submerging" device is of less width than the tub, which is a preferable though not a necessary construction, so that in case a hog is discovered by the attendant or workman not to have been thoroughly scalded it may be returned back to the place where the hogs are delivered or dropped into the tub and be caused to again traverse the length of the tub. After the hogs have been carried along the horizontal portion of the endless platform and have been thoroughly scalded they begin to ascend on the incline, and as soon as their bodies are above the water an opportunity is afforded for picking the bristles before they are finally delivered from the scalding-tub to the hog-scraper, (not shown,) so that my device forms a bristle-bench in addition to means for automatically passing or carrying hogs through a scalding-tub. My device is also capable, as will be obvious, of delivering the hogs automatically from the scalding-tub, so that the hog-dump as usually employed may be dispensed with. Furthermore, the usual bristle-bench which is now used outside of the tub and between it and the hog-scraper is entirely dispensed with and the hogs are delivered direct from the tub to the scraper. As shown in Figs. 1 and 2 of the drawings, the submerging device ends substantially where the inclined portion of the endless platform begins, so as not to obstruct the passage of the hogs as they come up the incline, which thus forms the bristle-bench.

Although I have described more or less precise forms and details of construction, I do not intend to be understood as limiting myself thereto, as I contemplate changes in the form, the proportion of parts, and the substitution of equivalents as circumstances may suggest or render expedient and without departing from the spirit of my invention.

I claim—

1. In a hog-scalding device, the combination, with a scalding-tub, of an endless traveling platform located in the tub and adapted to pass the hogs therethrough, an endless belt substantially horizontal and supported above the water-line of the tub, pairs of links projecting from the belt, cross-bars connecting the pairs of links, and means for actuating the belt.

2. In a hog-scalding device, the combination, with a scalding-tub, of an endless traveling platform located in the tub and adapted to pass the hogs therethrough, an endless belt substantially horizontal and supported above the water-line of the tub, an angular framework connected to and projecting from the belt, and means for actuating the belt.

3. In a hog-scalding device, the combination, with a scalding-tub, of an endless traveling platform located within the tub and having a horizontal portion for a part of its length and an inclined portion for the remainder of its length to form a bristle-picking bench and a delivery device and a submerging device arranged substantially above the horizontal portion only of the endless platform.

4. In a hog-scalding device, the combination, with a scalding-tub, of an endless traveling platform located in the tub and inclined upward toward one end thereof above the water-line so that such upper end forms a bristle-picking bench and a belt supported above the tub and adapted to keep the hogs submerged, such belt being of less width than the tub and providing a passage at the sides for returning a hog from the forward part of the tub so as to again traverse the length of the tub when desired.

5. In a hog-scalding device, the combination, with a scalding-tub, of an endless carrier or platform therein running substantially from end to end, and adapted to carry the hogs through the tub, such carrier having a horizontal portion for a portion of its length and an inclined portion for the remainder of its length to provide a bristle-bench, and a submerging device located substantially above the horizontal portion of the carrier.

FRED C. HOLDER.

Witnesses:
ALLAN A. MURRAY,
SAMUEL E. HIBBEN.